US008537184B2

(12) United States Patent
Roth et al.

(10) Patent No.: US 8,537,184 B2
(45) Date of Patent: Sep. 17, 2013

(54) LINERLESS LABELS

(75) Inventors: Joseph D. Roth, Springboro, OH (US); Jody L. Brookshire, Flowery Branch, GA (US)

(73) Assignee: NCR Corporation, Duluth, GA (US)

( * ) Notice: Subject to any disclaimer, the term of this patent is extended or adjusted under 35 U.S.C. 154(b) by 553 days.

(21) Appl. No.: 12/712,380

(22) Filed: Feb. 25, 2010

(65) Prior Publication Data

US 2011/0205326 A1    Aug. 25, 2011

(51) Int. Cl.
*B41J 2/325* (2006.01)

(52) U.S. Cl.
USPC ........................................................ 347/171

(58) Field of Classification Search
USPC ................. 347/171, 172–173, 175–176, 221; 400/82, 188, 120.01–120.04, 120.05; 368/327; 156/152
See application file for complete search history.

(56) References Cited

U.S. PATENT DOCUMENTS

| 5,591,290 | A * | 1/1997 | Walter et al. | 156/152 |
| 6,317,149 | B1 * | 11/2001 | Mochida et al. | 347/173 |
| 6,906,735 | B2 * | 6/2005 | Bhatt et al. | 347/175 |
| 7,742,366 | B2 * | 6/2010 | Haas | 368/327 |
| 2007/0211135 | A1 * | 9/2007 | Moreland et al. | 347/221 |

* cited by examiner

*Primary Examiner* — Kristal Feggins
(74) *Attorney, Agent, or Firm* — Charles Q. Maney; Paul W. Martin

(57) ABSTRACT

Linerless labels are presented. A label includes a specific pattern or set of patterns of adhesive applied to one side of the label. The adhesive pattern(s) reduces contact between a cutter blade of a printer and the adhesive on the one side of the label. Moreover, the adhesive patterns reduce buildup of adhesive on the cutter blade and reduce buildup at specific locations on the cutter blade. That is, the adhesive patterns more evenly distribute adhesive buildup across the cutter blade. Consequently, the cutter blade can be used for a longer period of time before the cutter blade needs to be cleaned of the adhesive.

20 Claims, 11 Drawing Sheets

LINERLESS LABELS

BACKGROUND

Linerless labels are an environmentally friendly labeling solution, avoiding the need for inclusion and/or disposal of a removable release liner. Use of linerless labels may pose a host of problems including increasing the propensity for adhesive build-up in a printer, resulting in printer jams, misfeeds and/or decreased performance.

SUMMARY

In various embodiments, techniques for design, manufacture and/or use of linerless labels are presented. According to an embodiment, linerless label media is presented. The media includes a first portion, and a second portion. The first portion of the media is situated on a front side of the media and includes one or more thermally sensitive coating(s), and may further include one or more coating(s) of release material. The one or more thermally sensitive coating(s) and/or the one or more release coating(s) may comprise one or more flood and/or patterned thermally sensitive and/or release material coating(s). The second portion of the media is situated on a back side of the media and includes one or more coating(s) of patterned adhesive(s). Depending on the embodiment, the release material(s) may be positioned on top of the thermally sensitive coating(s) on the first portion such that, where the media is wound in a roll, the release material lies proximate to and/or covers the patterned adhesive in a similar pattern thereto, and/or as a flood coat.

A label is configured to be cut (e.g., custom cut at a custom length) from a web or roll of the media via a cutting mechanism of, for example, a thermal printer. The pattern of adhesive(s) situated on the second portion of the media is selected to, for example, reduce contact between the cutting mechanism and the adhesive material(s) of the patterned adhesive. The pattern may also be selected to increase the uniformity of contact occurring between the cutting mechanism and the adhesive material(s) over the length of the cutting mechanism (e.g., knife or blade).

DETAILED DESCRIPTION

FIGS. 1A-1H are diagrams of different configurations for linerless label media, according to various example embodiments. FIGS. 1A-1H are shown for purposes of illustration only. Further configurations are achievable with the teachings presented herein.

In each of the FIGS. 1A-1H a back side of linerless label media is depicted. The back side includes a pattern of adhesive material(s) coated thereon. It is also noted that a front side, opposite the back side, exists for each linerless label media depicted in FIGS. 1A-1H, which front side may include one or more thermally sensitive coating(s), comprising one or more thermally sensitive ink(s), dye(s) and/or pigment(s), that, when thermally activated, may display information, such as information associate with a transaction (e.g., as for a receipt). The front side may further include one or more coating(s) of one or more release material(s), which coating(s) may be provided in flood and/or spot/patterned configurations. Such release material coating(s) may be configured to lie proximate to and/or cover the patterned adhesive when the linerless label media is wound in a roll, facilitating unrolling of the media without the adhesive bonding the back side to the front side. Where provided in patterned configuration, the release material coating(s) may replicate the pattern of the adhesive and thereby selectively cover the adhesive, providing for the above described ease of unwinding, and/or additional readability (human and/or machine) and/or security benefits as described hereinbelow with respect to the patterned adhesive(s). In one embodiment, a pattern of release material is provided on a first media side so as to cover the pattern of adhesive material on a second media side when the media is wound in a roll, wherein such coverage may be in excess of the coverage of the patterned adhesive by a predetermined amount (e.g., 5%, 10%, 20% and the like).

Figure 4:
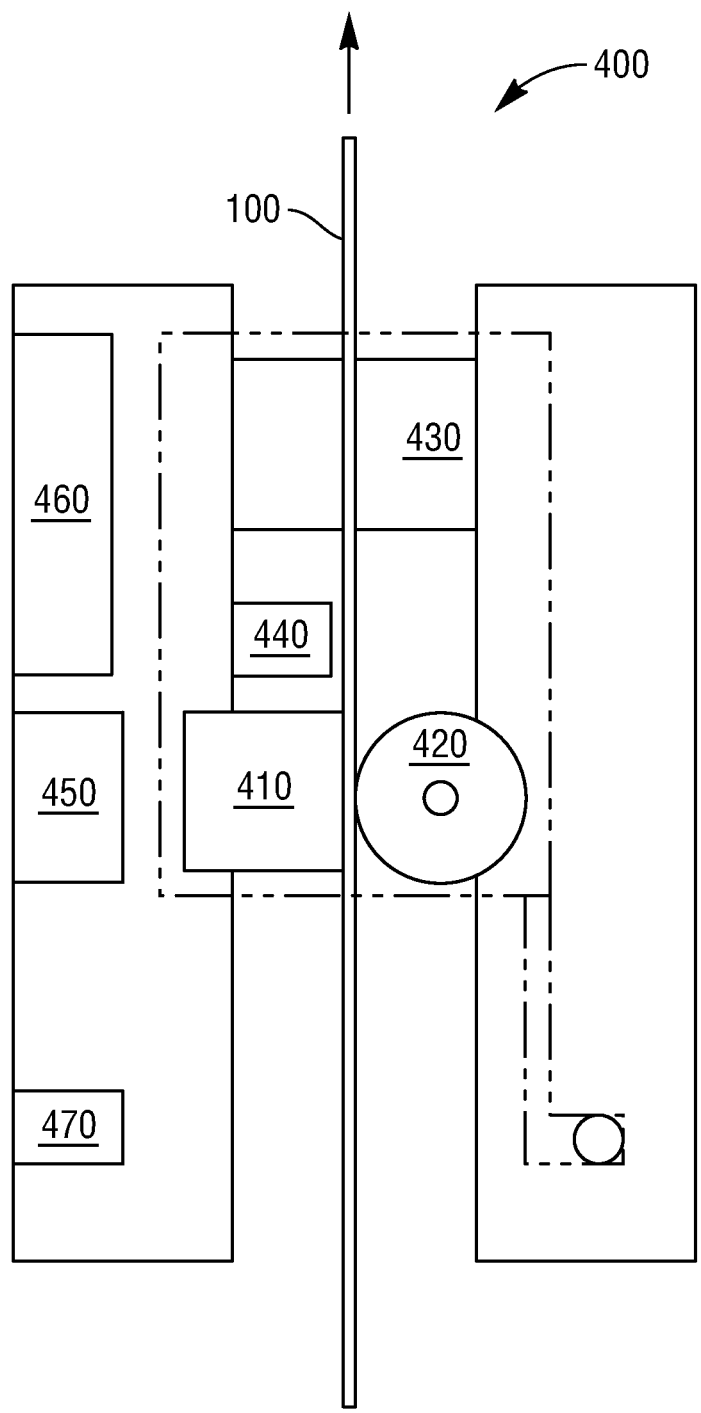
FIG. 4 is a diagram of a thermal printer for thermally printing linerless label media, according to an example embodiment.

The thermally sensitive coatings(s) on the first side of the linerless label media may be activated by feeding the media (including a longitudinally slit portion thereof) through a thermal (e.g., a direct thermal) printer, such as the thermal printer 400 of FIG. 4. As shown in FIG. 4, a thermal printer 400 may include a thermal print head 410, a platen 420, and cutting mechanism 430, such as a knife/blade, a slitter, and the like. The cutting mechanism 430 may be used to custom produce a linerless label of a custom size from installed linerless label media 100. One (first or front) side of the label may include the thermally sensitive coating(s) (activated or not) and/or release material(s), and the other (second or back) side may include the patterns of adhesive materials, as illustrated with respect to FIGS. 1A-1H. The linerless label media 100 may be further be provided in a roll.

As shown in FIG. 4, a thermal printer 400 may further include a motor and/or drive assembly 450 for transporting media 100 through the printer 400 (such as, for example, via driving rotation of the platen 420), a controller 460 (including, for example, a processor, and static/permanent and/or volatile memory) for controlling operation of the printer 400 (such as, for example, signaling a drive assembly 450 to transport media 100 through the printer 400; providing a signal to a print head 410 to print particular information on the media 100; and/or signaling a cutter 430 to cut the media 100 at a location based on a signal provided by a sensor 440 in sensing presence, absence, distribution, and the like of adhesive), and a communication module 470 for receiving print information (e.g., transaction data) and/or commands (e.g., print and/or knife cut commands) from an associated host computer (not shown) and/or providing the same to the controller 460.

Each label may be configured to be custom cut at a custom length from a web or roll of the media via a thermal printer which includes a cutting mechanism. Further, the patterned adhesive may be configured on the second portion of the media in such a manner so as to reduce and/or vary the contact between the cutting mechanism and the adhesive materials. In some embodiments the patterned adhesive may be configured on the second portion of the media in such a manner so as to uniformly/approximately uniformly distribute any contact occurring between a cutting mechanism and the adhesive material over a length/width of the cutting mechanism over the course of continued use thereof/cutting therewith. Such use may include cuts across (e.g., perpendicular to) and/or along (e.g., parallel to) the running axis of a web of media, including multiple cuts to produce like and/or varied length labels from such media. The details of this and the patterns are now presented in detail with reference to the FIGS. 1A-1H.

Figure 1A:
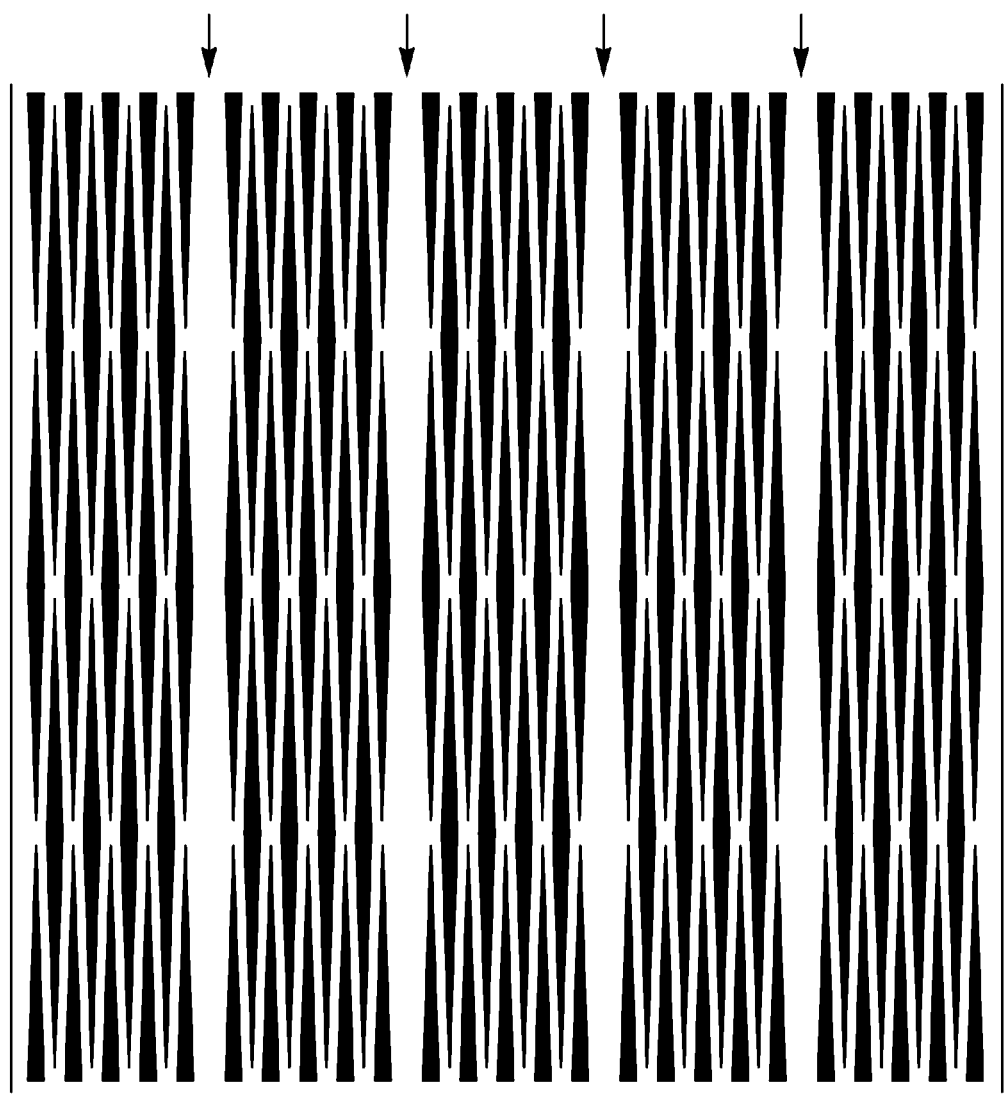
FIGS. 1A-1H are diagrams of different configurations for linerless label media, according to various example embodiments.

In one embodiment, as depicted in the FIG. 1A, the patterned adhesive may be coated on a relatively wide web (e.g., a log roll) of label media in elongated diamond shapes, which shapes may interlock (e.g. cross into the region defined by the maximum width of an adjacent shape, with or without physically overlapping at any location), and may repeat at predefined or random distance(s). After production thereof, such web may be slit lengthwise (e.g., along its running axis) at various widthwise positions thereof (e.g., as illustrated in FIG. 1A by the vertical arrows) to produce various narrower width products (e.g., ~44 mm, ~58 mm, ~80 mm, and like widths) for, for example, end customer use in receipt/label thermal printers.

Figure 1B:
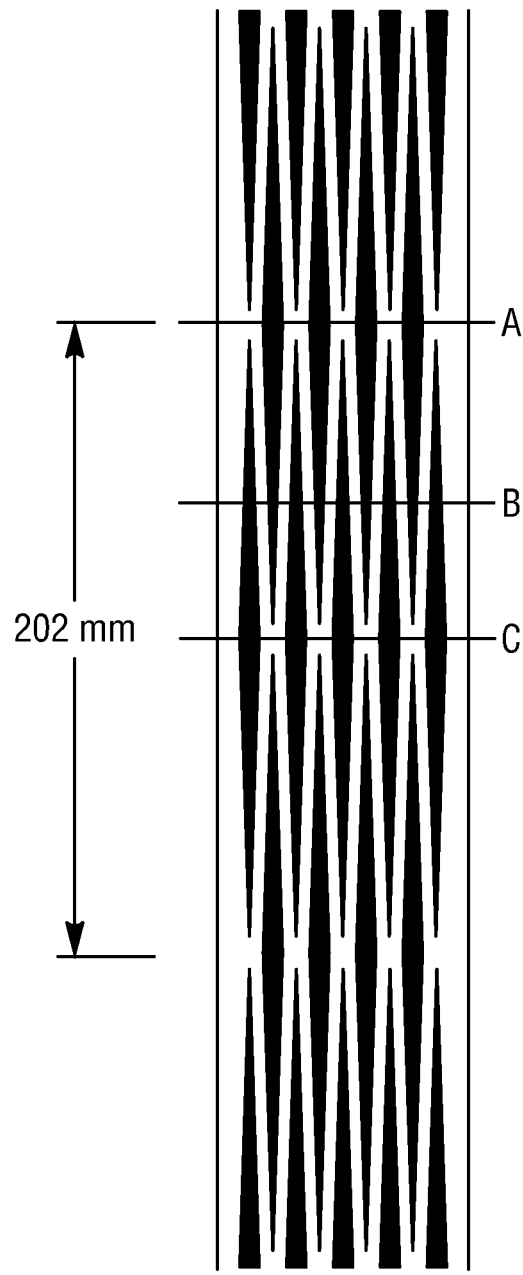

As shown in FIG. 1A, a diamond adhesive pattern may be provided. In the illustration of FIG. 1A, such pattern may be provided on multiple portions of a wide web for, for example, later slitting into a final, narrow width product as illustrated in FIG. 1B. Likewise, as shown in FIG. 1B, such pattern may be centrally located across the width of a narrow width product, and may span only a portion of the width of such final product, although variations are possible (see, e.g., FIG. 1H).

In the embodiment of FIG. 1A, the portion of media that would become the edges of a narrow, slit label product as in, for example, FIG. 1B (e.g., following the vertical arrows down the length of the illustration of FIG. 1A), are free of adhesive to create adhesive free lanes for slitting of the wide with product of FIG. 1A, and thereby mitigate build-up of adhesive on the slitting mechanism (e.g., cutter, knife, and the like). Variations are possible including where the adhesive pattern is offset with respect to the centerline of a final, slit product, and/or where the adhesive spans the width of the wide and/or final slit product, including where no adhesive free lanes are provided for slitting.

In the embodiment of FIG. 1B, a narrow web of media, cut, for example, from the wide web of FIG. 1A, is shown. In FIG. 1B, three, potential, horizontal cut locations (A, B, and C) are illustrated. Such cut locations may be utilized during and/or result from cutting the web of media of FIG. 1B to product a label/receipt associated with, for example, three separate transactions, by a cutter or cutting mechanism associated with a thermal (e.g., receipt) printer. As shown, the three cuts would result in three, varied/custom length linerless labels. The first linerless label is represented by the area appearing vertically above the A cut in FIG. 1B. The second linerless label is represented by the area appearing vertically above the B cut and bounded on the top by the A cut in FIG. 1B. Finally, the third linerless label is represented by the area appearing vertically above the C cut and bounded on the top by the B cut in FIG. 1B.

As illustrated in this and other embodiments, problems associated with adhesive buildup on a cutter of a thermal printer can be minimized by patterning the adhesive in a certain manner. For example, the adhesive may be patterned such that the location(s) where the adhesive comes into contact with the cutter may vary with each cut such as, for example, via varying the pattern and/or any repeat of its pattern along the running axis of the web of media, and/or via varying the location of the cut(s) (e.g., as in cut locations A, B and C of FIG. 1B) including as a consequence of the varied length of material that may be required for a given use (e.g., variation of media length with transactions/receipt details) or purposefully via printer control logic (etc). In preferred embodiments the pattern and or the cutting location through the media should spread the adhesive contact across as much of the cutter as possible (e.g., over time) to minimize deposition in localized regions which may adversely affect subsequent cutter performance and/or media feed (resulting in, for example, media mis-feeds and/or jams).

For example, at position "A" in the embodiment of FIG. 1B the cutter passes through adhesive in four discrete locations across the width of the media web. At position "C" the cutter passes through adhesive in five discrete locations, different from the locations of position A (e.g., the adhesive areas at position A and C do not coincide and/or overlap). At position "B" the cutter passes through adhesive in nine discrete locations which, in the embodiment of FIG. 1B, coincide with a portion of each of the locations of positions A and C.

Within the repeat length (if any) of an adhesive pattern, such as that shown in FIG. 1B (e.g., 202 mm), the adhesive distribution across the cutter is different at each of the different, illustrated cross-web cut locations (e.g., A, B and C). Thus the contact between the adhesive and the cutter from the various cuts is distributed across the cutter and, any buildup its, therefore, not concentrated in a particular area or areas. Spreading the adhesive, and any resultant buildup, over the width of the cutter increases the number of cuts required to reach a problem amount of buildup, thereby minimizing the occurrence of associated problems. Further, cutting through regions without adhesive, which adhesive free regions may also vary with different cross-web cut location (e.g., locations A, B and C in FIG. 1B), can assist in cleaning/removing any previously deposited adhesive therefrom.

In addition to mitigating problems associated with adhesive build-up on a printer cutter, selectively patterned adhesive may minimize adhesive buildup on other portions of a printer along a media feed path (e.g., rollers, platens, print heads, and the like), thereby mitigating problems (e.g., media mis-/choppy feed, jams, and the like) associated therewith. Patterned adhesives can reduce these problems.

Patterning the adhesive can also reduce the amount (e.g., surface area) of adhesive in contact with various surfaces and/or portions of the thermal printer. This may allow the use of tackier adhesives without additional printer (e.g., jamming and/or mis-feed) problem.

In addition, patterned adhesive may mitigate issues associated with print media jamming as a result of adhesive bonding/the bond strengthening over time such as, for example, between the period of time when a final print is made on a first day and a period of time when a print is first attempted to be made on a second day.

Depending on the embodiment, it may be desirable to avoid having the repeat length of the adhesive pattern the same or approximately the same as the length of a typical label/receipt such as, for example, where the same length label/receipt is printed/produced repeatedly. This would cause the same part of the cutter to pass through adhesive with every cut, potentially, depending on the embodiment, negating some of the benefits of the patterned adhesive. This problem can be avoided by going to long repeat lengths in the adhesive pattern, and/or randomized adhesive patterns.

Figure 1C:
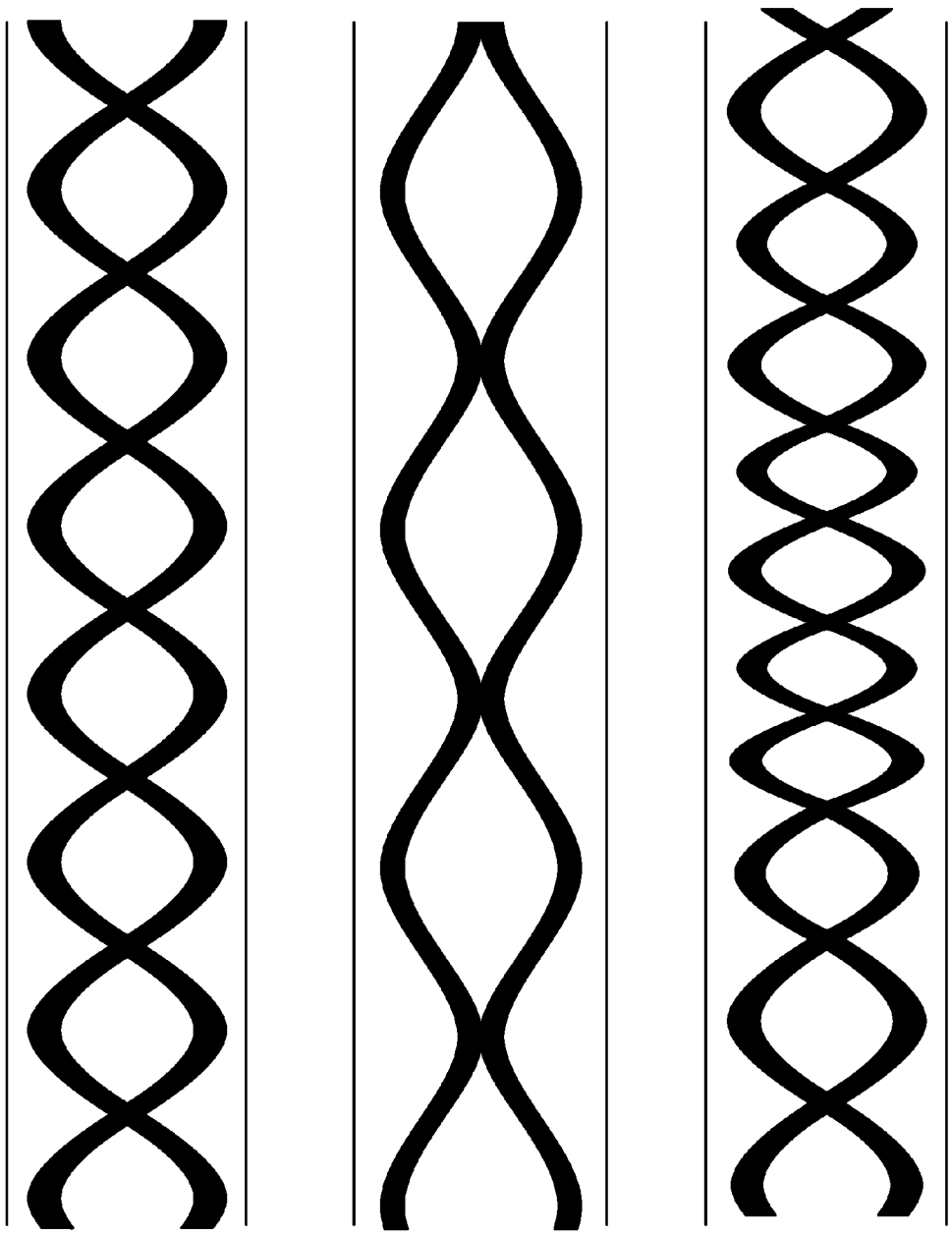

FIG. 1C illustrates various variations in the repeat length of an adhesive pattern. For example, the left pattern in FIG. 1C shows a short repeat length. The center pattern illustrates an adhesive pattern with a modified, increased repeat length. Finally, the right pattern illustrates an adhesive patter with a further modified, increased repeat length. Note, depending on the embodiment, the repeat length may be varied (including increased) without varying the overall nature (including design) of the pattern. Varying the repeat length with respect to an expected cut length/location (e.g., long repeat lengths for typically short receipts) can avoid repeatedly cutting through the same location of a patterned adhesive, and thereby avoid localized/heavy adhesive buildup. The likelihood of a typically short, cut media portion (e.g., label/receipt) length equaling a long adhesive pattern repeat length, and thereby having a cut fall on a similar portion of the pattern, is small. It should be noted that, where possible, repeatedly cutting media portion (e.g., label/receipt) lengths which are and/or are expected to be an integer multiple of the repeat length should be avoided. Likewise, repeat lengths should be selected such that they are longer than, and not an integer multiple of, typical/expected cut media portion (e.g., label/receipt) lengths.

Permissible repeat lengths may be limited depending on the apparatus used to manufacture label media, including applying an adhesive pattern to a substrate/web. For example, for a rotary printing press, the maximum repeat length may be limited to the circumference of the cylinder used to apply the adhesive to the web.

In an embodiment, a gravure coater may be modified to put down a patterned coating (e.g., adhesive). The "normal" gravure cylinder may be replaced by a banded gravure cylinder. A banded gravure cylinder has bands of gravure cells with un-engraved areas between the bands. The absence of gravure cells results in no coating in that area. In a similar manner, patterns may be produced by placing gravure cells in the mirror image of the desired pattern. In essence, a patterned gravure cylinder turns a gravure coater into a simple one-station gravure press.

Figure 1D:
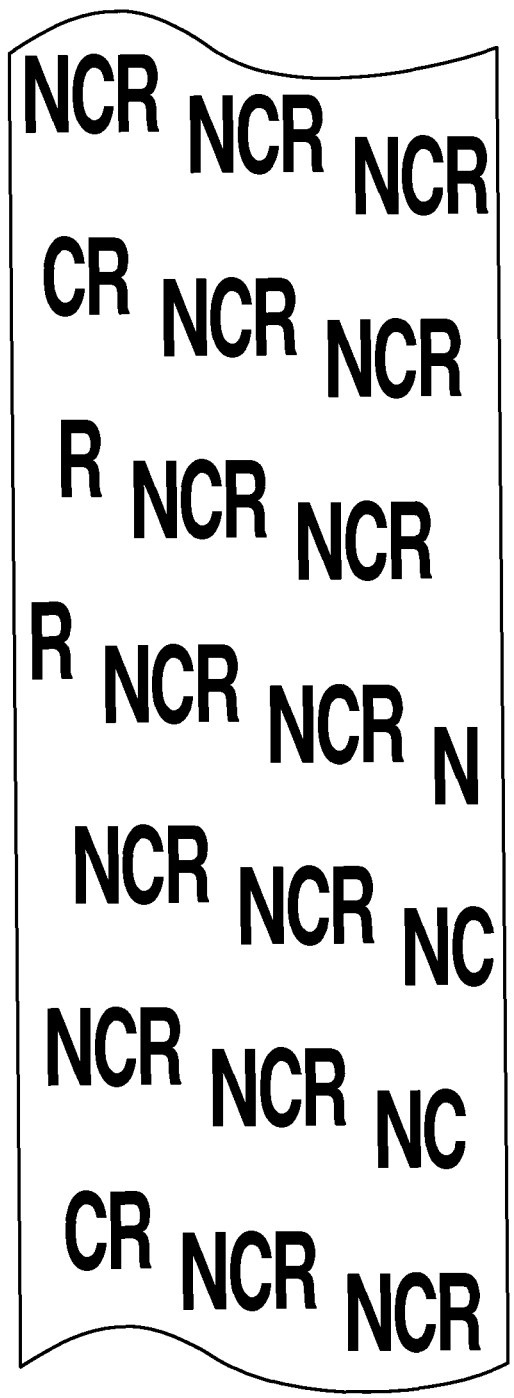

The functionality of an adhesive pattern can be further enhanced by placing or otherwise encoding human or machine readable information in the pattern. This is illustrated with respect to FIG. 1D and FIG. 1E. FIG. 1D shows an adhesive pattern as a series of company logos. In FIG. 1D, the shape of the adhesive comprises a logo (other shapes and sizes, and/or information content(s) are possible), while the pattern thereof is set to distribute the adhesive across the cutter such that cutter contact with adhesive is different at every potential cut-off position within the repeat length of the pattern. In addition to mitigating printer jams and cutter deposition/fouling issues, this configuration provides a methodology for providing for brand recognition and/or document security as it is more difficult to print adhesive than inks, and therefore more costly/difficult to counterfeit. For example, the pattern of FIG. 1D would be extremely difficult to be counterfeited on a personal computer/printer.

Further, adding coloration (e.g., dyes and/or pigments) to the adhesive can make the image more visible/attractive, enhance machine readability, and/or further enhance the security aspect. For example a printed textual and/or graphical image (e.g., NCR in FIG. 1D) may be provided using a green colored adhesive, and thereby be read/viewed directly, and/or with a suitable (e.g., green) spectrum reader. Likewise, security dyes and/or pigments (e.g., ultraviolet (UV) and/or fluorescent) may further enhance the security aspect of the adhesive image, including machine readability. It should be noted that in further embodiments, the shape of the adhesive can be any human and/or machine readable text and/or graphic. Likewise, depending on the shape/characteristics thereof, various information may be encoded in the adhesive and/or its pattern, and/or represented/provided by it.

Figure 1E:
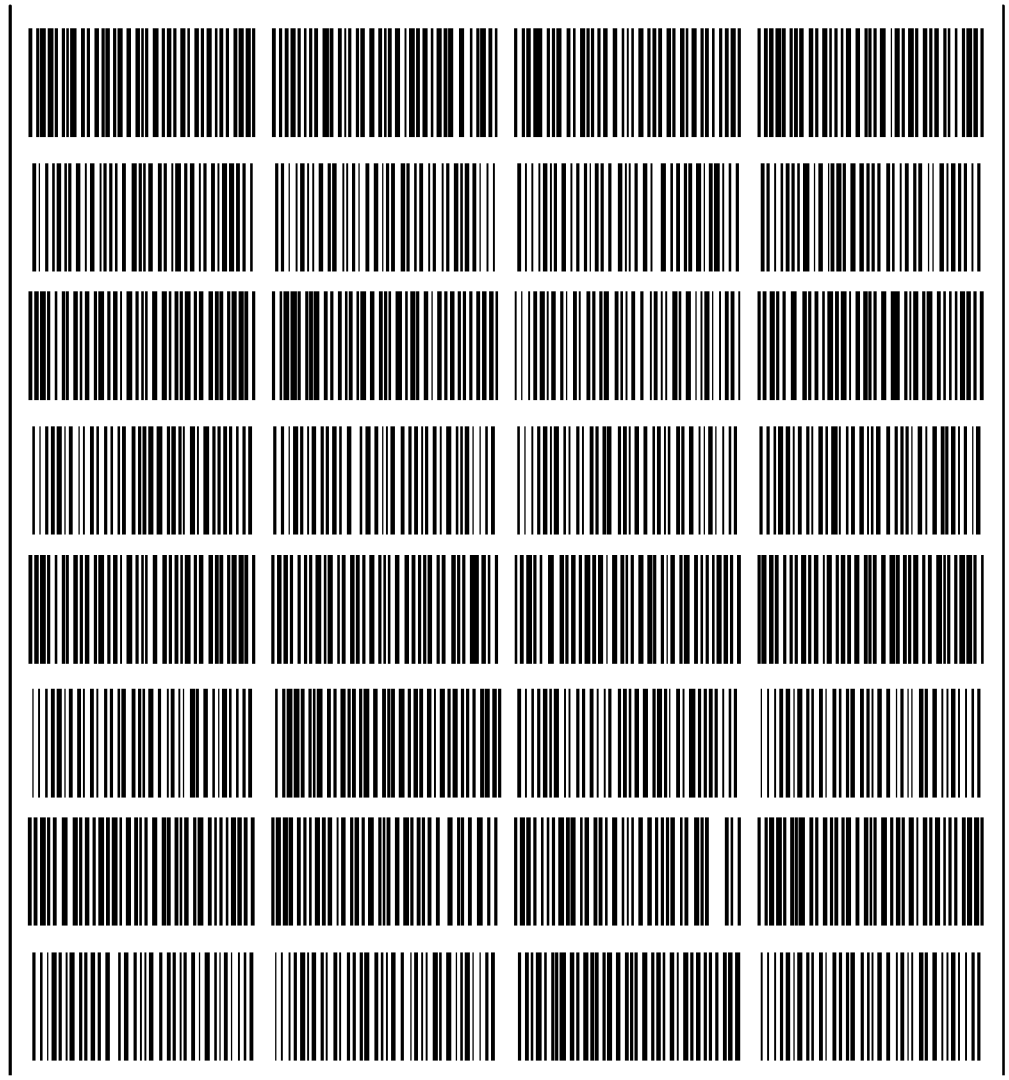

FIG. 1E illustrates a further embodiment of including information in and/or as a result of the shape of the adhesive via using an adhesive pattern comprising (e.g., machine-readable) barcodes. In the example of FIG. 1E, the adhesive image is a 1-D (one dimensional) barcode followed by the inverse image of the same barcode. Such alternating pattern distributes the adhesive across the web in a desired (e.g., non-uniform) manner. As described above, depending on the embodiment, the adhesive may include one or more colorants (e.g., dyes and/or pigments) and/or security markers (e.g., fluorescent dyes and/or pigments) to enhance its human and/or machine viewing/readability. Additionally or alternatively, the substrate surrounding the adhesive pattern may be colored to render the bar code (or other image/pattern) human and/or machine readable, and/or enhance its human and/or machine readability. Such coloring may occur via application of, for example, a water-based coating which may preferentially be absorbed by the substrate surrounding the patterned adhesive, as opposed to the adhesive itself. Such surrounding coloration, including via visible and/or security dyes and/or pigments, makes the barcodes visible to a human and/or machine (e.g., scanner). As stated above, this approach may be used to provide additional security features to a linerless label/receipt. It should be noted that while 1-D barcodes were used in this example, the concept can readily be extended to 2-D barcodes and/or other shapes and/or patterns.

In various embodiments, the machine readable nature of the patterned adhesive may be used to augment use of the physical characteristics of the pattern via triggering a cut of the media to minimize adhesive contact and/or deposition. For example, in various embodiments, features of the adhesive pattern (e.g., presence of adhesive, absence of adhesive, distribution of adhesive, repeat length, including relative location therein) may be sensed (e.g., by a sensor 440, such as an optical sensor, of a thermal printer 400) and a cut location selected to maximize variation of the cut location, such as with respect to the repeat length, and thereby minimize deposits and their resultant deleterious effects. In addition, depending on the pattern, a cut-wise "gap" in the pattern may be sensed (e.g., as between adjacent bar codes in FIG. 1E) and a cut made therein. Likewise, periodic "cleaning" of the print surfaces (e.g., cutter) may be performed by variously and/or alternately selecting cut portions having, for example, a mirror imaged adhesive pattern to that recently, and/or in aggregate formerly, cut through in order to wipe the adhesive contacted areas with non-adhesively coated media portions, and thereby clean the cutting surface(s) of prior deposits. Further, sensing of an adhesive pattern may be performed to cut through a clear or near-clear (or other desired) region irrespective of what the particular print job (e.g. transaction receipt) may require in order to periodically and/or systematically (e.g., when a cut is called for proximate to such a region) clean the entire cutter width and/or minimize new deposition, maximize the variability of the portion of the adhesive pattern cut through, and the like.

Figure 1F:
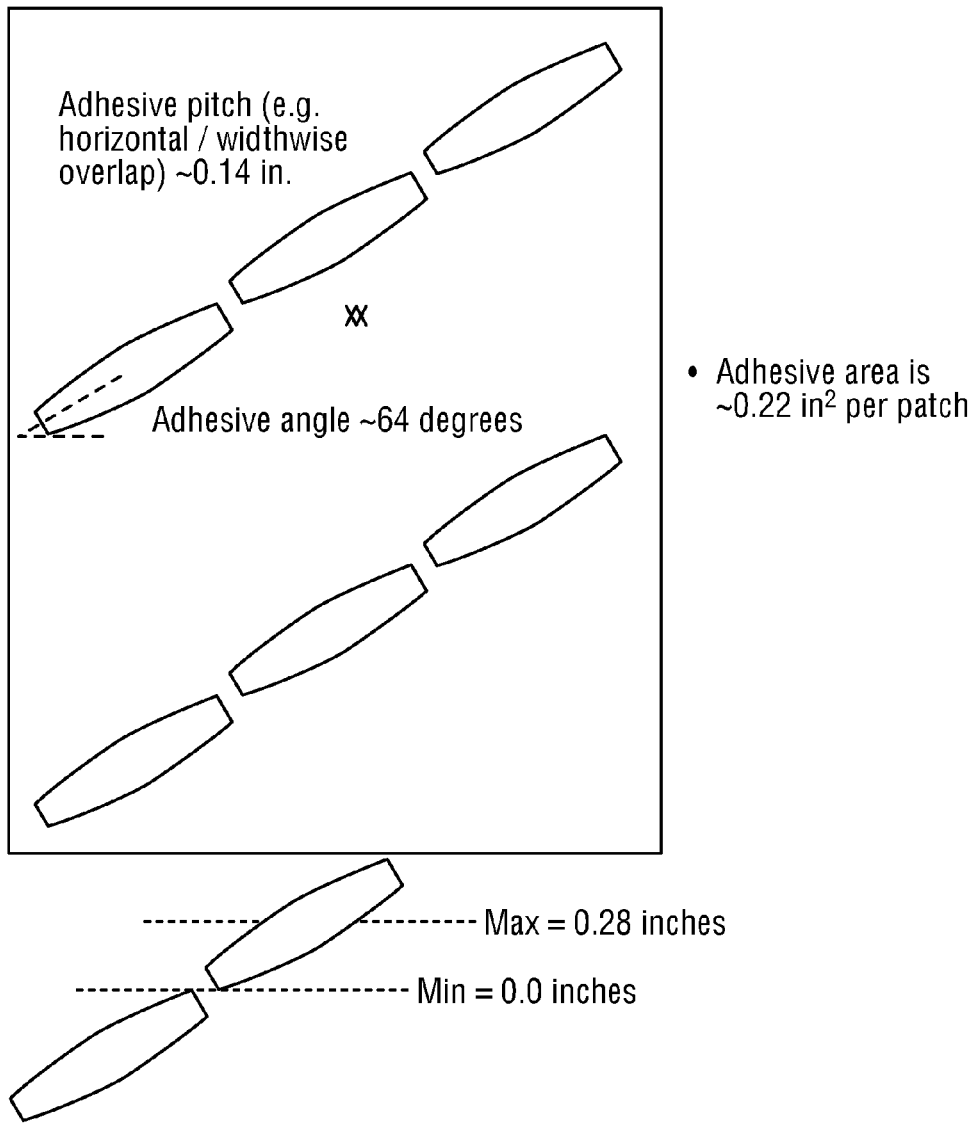

The FIG. 1F shows a further embodiment of a patterned adhesive. Here, a predefined shape of adhesive (shown in the embodiment of FIG. 1F as having two parallel and two convex sides, although other shapes/sizes are permissible) is organized in sets (of, for example, three) having predefined dimensions and situated at predefined angles and pitches within the media roll or web. Additionally, the predefined sets are spaced at predefined distances from one another along the running axis of the roll/web. For the embodiment/dimensions depicted in the FIG. 1F, the probability of no adhesive contact with a cutter is 3%, the probability for maximum adhesive contact is 14%, and, significantly, the probability of achieving between the maximum and minimum (e.g., random) contact is 97%.

Figure 1G:
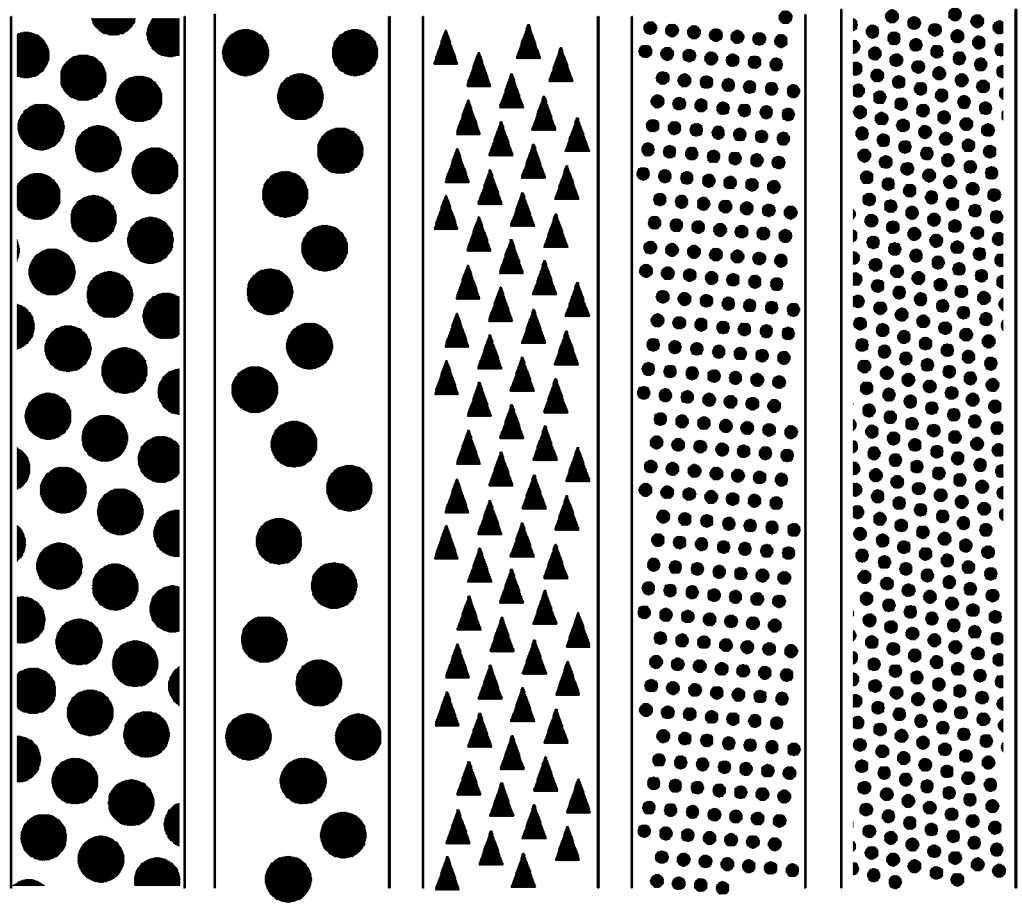
Figure 1H:
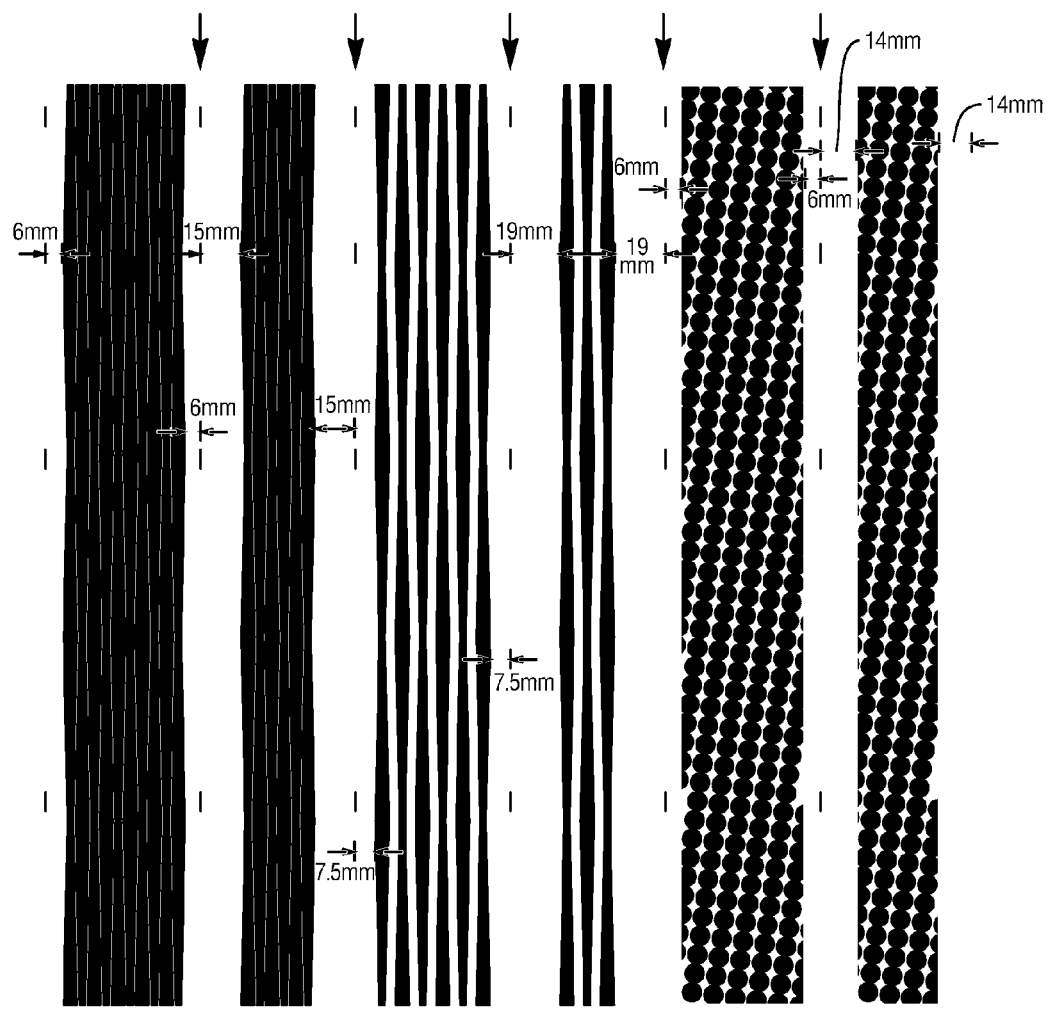

FIGS. 1G and 1H show further embodiments of patterned adhesive for, for example, use in linerless labels. In FIG. 1G, various adhesive shapes (e.g., circles and triangles), and sizes/distributions thereof, on a second side of a narrow media product are shown. In addition, for all of the configurations of FIG. 1G, the patterned adhesive approximately spans the width of the respective illustrated media products, although variations, such as where such patterns span less than the entire width and/or are biased and/or confined to a particular centerline/running axis side, are possible.

FIG. 1H illustrates a wide web of patterned adhesive media having a multitude of different adhesive patterns thereon. Such wide web may be produced by, for example, a gravure coater/press as, for example, described hereinabove. Further, individual (e.g., six in the illustrated embodiment), narrow web products (e.g., for end use in a thermal printer) may be slit from the wide web, or it may be used as produced. In an embodiment, six narrow web products may be slit from the wide web product following and along the direction of the arrows on the top of FIG. 1H.

As shown in FIG. 1H, various adhesive patterns may be produced utilizing having similar, or different, overall elements shapes. For example, the left four patterns all include variations of diamond shaped adhesive. Likewise, the right two patterns both include variations of circular shaped adhesive. In the left four configurations, coverage of the adhesive pattern is varied via varying the uncoated media portion within the region of the media coated with adhesive (e.g., within the overall width of the adhesive band), as well as via varying the size of the region itself (e.g., the width of the adhesive with respect to the width of the web/to-be-slit portion thereof). The right two configurations illustrate variations in coverage with respect to the width of the adhesive band as compared to width of the web/media. In all instances, the illustrated band of adhesive is centered/approximately centered on the width of what would be the narrow media product when the wide web is slit as indicated. Variations are, however, possible, such as where the illustrated band(s) of adhesive are biased with respect to the center of the to-be-cut, narrow web portions, including being baised to one side thereof (including being located proximate to an edge of a to-be-cut, narrow web portion).

As illustrated with respect to the configurations of FIG. 1H, the overall width of a band of adhesive may vary with respect to the width of the web of media, whether taken as a wide web or one or more narrow webs that may be slit therefrom. For example, in various embodiments, the width of a band of adhesive may span a portion of the width of a web of media, including spanning an amount equivalent to approximately 20%, 25%, 50%, 66%, or 80% of such width, and the like. In one embodiment, the width of the band of adhesive is set to be not more than 50% of the width of the web (wide or narrow) of media. In another embodiment, the width of the band of adhesive is set to be not less than approximately 80% of the width of the media web. Variations are possible.

It can be now appreciated that linerless labels can be constructed via patterned adhesive for purposes mitigating deleterious effects of adhesive contacting various portions of a printer including, among other things, a cutter. Likewise, cutting thereof may be performed without sense marks and/or may be performed using the patterned adhesive as a sense marks, further enhancing the beneficial effects. Further, as described hereinabove, a gravure coater/press may be used to prepare a web of patterned adhesive media.

Figure 2:
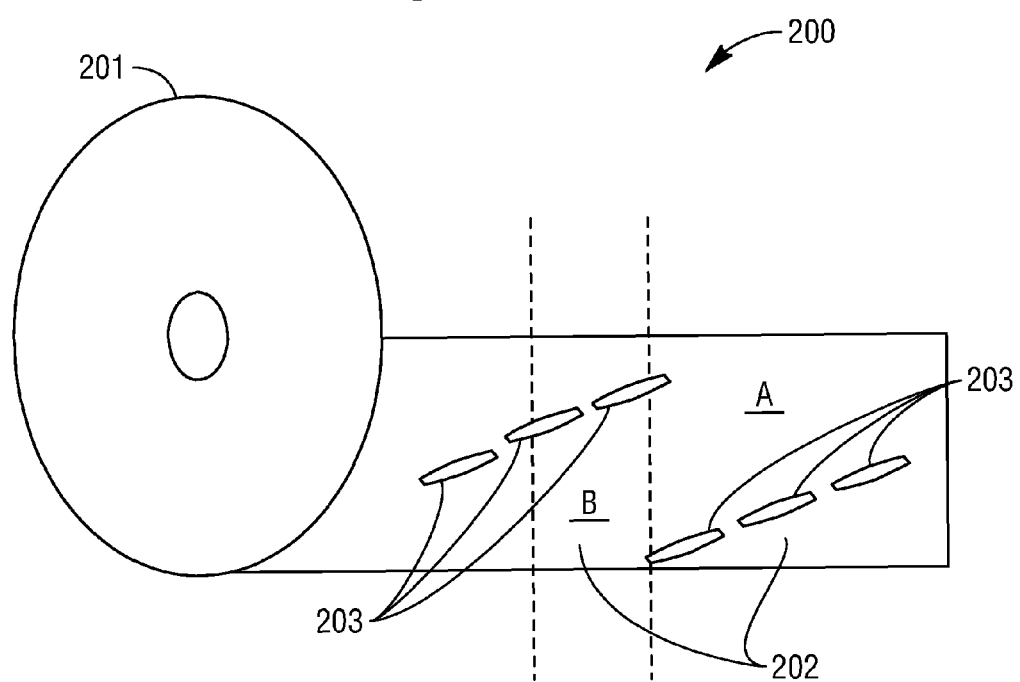
FIG. 2. is a diagram of a linerless label media making apparatus, according to an example embodiment.

FIG. 2. illustrates a diagram of linerless label material 200, according to an example embodiment. While the linerless label material 200 is described hereinbelow with respect to the patterned adhesive of FIG. 1F, the linerless label material 200 may comprise any of the configurations depicted for the patterned adhesive media in FIGS. 1A-1E and/or 1G-1H.

The linerless label material 200 includes a roll or web of media 201 comprising patterned adhesive media in roll form and, thereby, laminated to itself. Linerless label material 200 may be used to provide a series of individual linerless labels 202 (identified as, for example, the regions of unrolled media marked as "A" and "B" in the FIG. 2). Each of these components and their relationship to one another is now discussed in detail below with reference to the FIG. 2.

In various embodiments, the roll of media 201 includes a front side or portion having one or more thermally sensitive coatings (not shown) and a back portion (visible in the FIG. 2) with repeating patterns of adhesive materials 203. A label 202 (shown as, for example, A and B in FIG. 2) may be custom cut from the roll of media 201 by, for example, a cutter of a thermal printer, at custom lengths. The front portion of the label 202 (not shown in the FIG. 2) may further display information (e.g., from a transaction) when the thermally sensitive coating is activated by a thermal print head of the thermal printer.

Once printed/cut, the back portion of a label 202 may permit the label 202 to be affixed to another surface (e.g., carton, container, surface, or substrate) via the adhesive materials. Moreover, the repeating patterns 203 of the adhesive materials are configured or situated on the back portion of the roll of media 201 so as to minimize contact between various surfaces of a thermal printer, such as a cutter blade, and the adhesive materials each time the thermal printer custom cuts a particular label (A or B) from the roll of media 201.

According to an embodiment, the repeating pattern 203 may include information (e.g., via a particular pattern, graphic, text or the like) that is visibly conveyed, or that can be acquired via a scanning device from the adhesive material (such as, for example, via a bar code scanner when the repeating pattern 203 is a bar code as described with respect to FIG. 1C hereinabove).

Further, in various embodiments, some or all of the adhesive material(s) may include colorants to make portions of the adhesive materials visible to the naked eye or visible when exposed to UV light or different predefined frequencies of light.

In a particular case, such as what was discussed above with reference to the FIG. 1F, at least one of the patterns may be configured to have a predefined maximum width, a predefined minimum width, a predefined pitch, a predefined angle, and have respective repeating patterns be separated from one another by a predefined distance on the roll of media 201. This statistically improves the exposure of the cutting mechanism in the thermal printer to the adhesive material at various locations each time a cut is made on the roll of media 201 to produce a linerless label 202.

In yet another situation, the distance between the repeating patterns is configured to be large enough so as to exceed a maximum length for any custom linerless label 202 that produced from the linerless label material 200.

Figure 3:
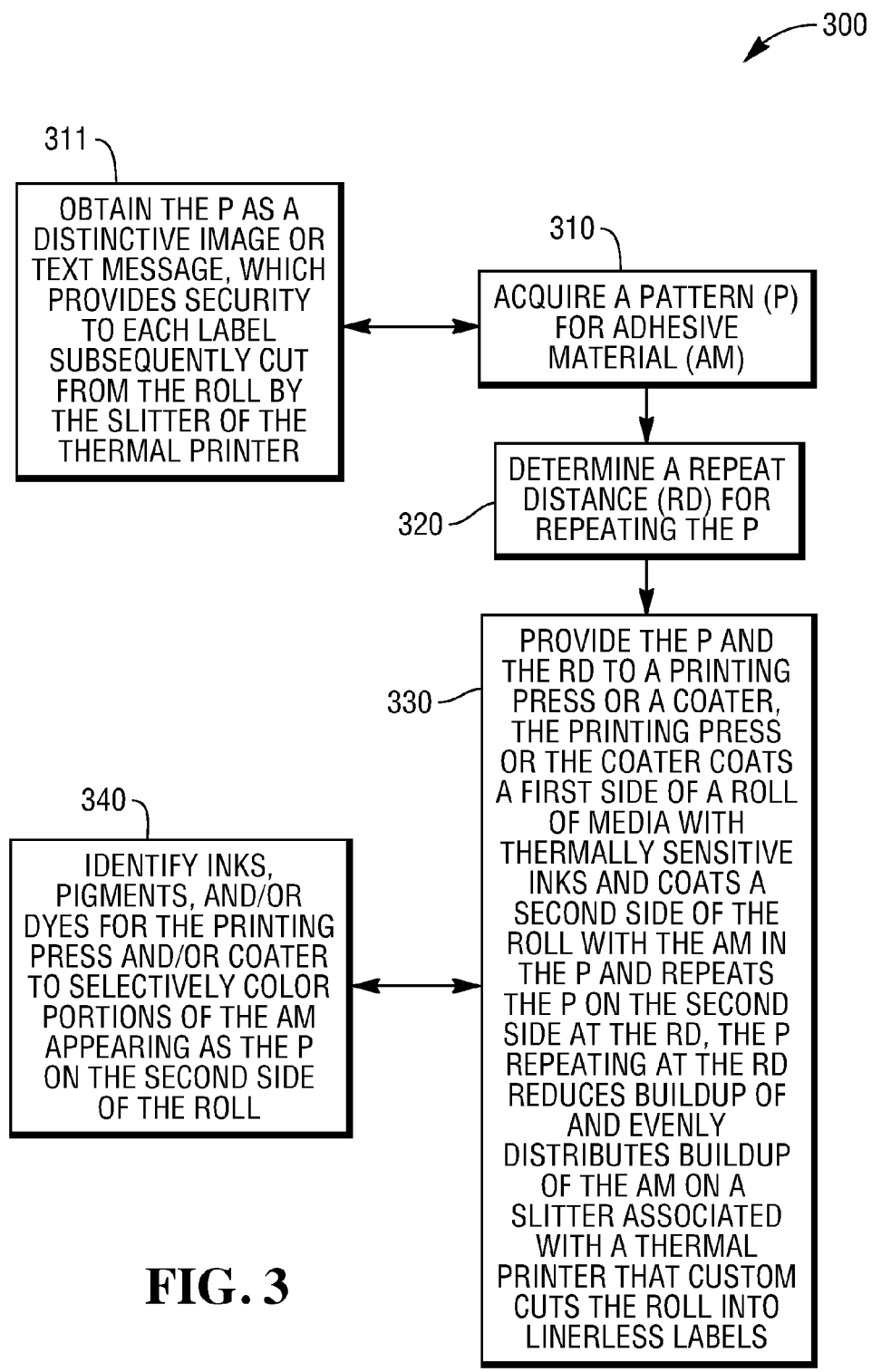
FIG. 3 is a diagram of a method for creating and using linerless label media, according to an example embodiment.

FIG. 3 is a diagram of a method 300 for creating and using a linerless label (such as the linerless label 202 of FIG. 2), according to an example embodiment. The method 300 (hereinafter "labeling process") is implemented in one or more machines adapted to process print media. The labeling process produces and uses the linerless labels discussed with respect to FIGS. 1A-1G and FIG. 2.

At 310, the labeling process acquires a pattern for adhesive material. This can be preconfigured into the machine that executes the labeling process (e.g., via a banded gravure cylinder) or it can be acquired from a database based on the identity of a customer, type of roll or web of media, end use(s) (including printer design/type), and the like.

In one case, at 311, the labeling process obtains the pattern as a distinctive image or text message, which provides security to each label subsequently cut from the roll of media by the slitter or cutter of the thermal printer.

At 320, the labeling process determines a repeat distance for the pattern. Here, the repeat distance can also be a machine configuration parameter, a profile for a customer based on largest known size for a receipt on a cut label, a parameter based on end use (including printer) requirements, and the like.

At 330, the labeling adhesive process provides the pattern and the repeat distance to an adhesive application device (e.g., a printing press or a coater). The printing press or coater may, then, apply a thermally sensitive coating to the first side of the media and/or (including subsequently) coat a second side of the media with the adhesive material in the acquired pattern. The printing press or coater uses the repeat distance to repeat the adhesive pattern on the second side of the roll of media.

The repeating pattern at the repeat distance on the second side of the media assists in reducing buildup of and/or evenly distributing of any buildup of the adhesive material on a slitter or cutter (or other surface) associated with a printer (e.g., a thermal printer) that subsequently prints and/or custom cuts the roll into linerless labels.

According to an embodiment, at 340, the labeling process 300 may also identify colorants (e.g., inks, pigments, and/or dyes) for the printing press and/or coater to selectively color portions of the adhesive materials appearing as the pattern on the second side of the roll. Again, this can be used to reduce counterfeiting and improve linerless label security, as well as provide for improved human and/or machine readability.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. Label media, comprising:
a substrate having a first and a second side opposite the first side;
a thermally sensitive coating on the first side of the substrate; and
an adhesive layer on the second side of the substrate;
wherein the adhesive layer is variably patterned to include areas with adhesive and areas without adhesive to vary locations of contact between the adhesive layer and a cutting mechanism making variably located lateral cuts across width of the substrate.

2. The label media of claim 1, wherein the adhesive is configured to be applied to the second side of the substrate via a banded gravure cylinder coating device.

3. The label media of claim 1, wherein the areas without adhesive comprise adhesive free lanes arranged vertically and/or horizontally within the adhesive layer.

4. The label media of claim 1, wherein the areas with adhesive comprise elongated diamond shapes stretching vertically across the second side.

5. The label media of claim 1, wherein the areas with adhesive are configured to repeat on the second side at intervals that exceed lengths associated with individual labels cut therefrom.

6. The label media of claim 1, wherein a repeat length for the areas with adhesive is configured to be equal to a circumference of a gravure cylinder used to apply the adhesive to the second side of the media.

7. The label media of claim 1, wherein the adhesive is configured to provide information.

8. The label media of claim 7, wherein at least a portion of the adhesive includes a dye, pigment, and/or ink to render the information readable.

9. The label media of claim 7 wherein the adhesive is configured as a logo.

10. The label media of claim 1, wherein the adhesive is configured as custom repeating text and/or images, the text and/or images patterned to provide a mechanism for detecting counterfeiting of the media.

11. The label media of claim 1, wherein the adhesive layer comprises a series of repeating bar codes and an inverse of the bar codes, the bar codes capable of being machine read for information represented thereby.

12. The label media of claim 11, wherein the regions surrounding the bar codes includes color from a water based marker which is read to discern information represented by the bar code.

13. The label media of claim 1, wherein the adhesive layer comprises a repeating series of three adhesive patches with each patch being at a predefined angle and predefined pitch, each repeating series separated by a predefined distance along a running axis of the media, and each patch having a predefined minimum width and a predefined maximum width.

14. A label making apparatus, comprising:
a roll of media having a front portion including thermally sensitive ink, and a back portion having repeating patterns of adhesive material coated thereon; and
a label configured to be custom cut from the roll of the media by a thermal printer at custom lengths, the front portion displaying information for a transaction when the ink is activated by the thermal printer and the back portion permitting the label to be affixed to an object via the adhesive material, the repeating patterns of the adhesive material configured on the back portion to minimize contact between a cutter blade of the thermal printer and the adhesive materials each time the thermal printer custom cuts a particular label from the roll of the media.

15. The label making apparatus of claim 14, wherein the patterns of adhesive material include information that is visible or that can be acquired from the adhesive material via a scanning device.

16. The label making apparatus of claim 15, wherein select portions of the adhesive material includes ink to make the portions visible.

17. The label making apparatus of claim 14, wherein at least one of the patterns is configured to have a predefined maximum width, a predefined minimum width, a predefined pitch on the back portion, a predefined angle on the back portion, and be separated from another of the repeating patterns by a predefined distance.

18. The label making apparatus of claim 14, wherein distance between the repeating patterns is configured to be larger than a maximum length for any label made by the label making apparatus.

19. Label media, comprising:
a substrate having a first and a second side opposite the first side;
a thermally sensitive coating on the first side of the substrate; and
adhesive on the second side of the substrate;
wherein the adhesive is variably patterned on the second side of the substrate to vary locations of contact between the adhesive and a cutting mechanism making variably located lateral cuts across width of the substrate, the pattern comprising a column of circular dots diagonally oriented along the running axis of the substrate.

20. Label media, comprising:
a substrate having a first and a second side opposite the first side;
a thermally sensitive coating on the first side of the substrate; and
adhesive on the second side of the substrate;
wherein the adhesive is variably patterned on the second side of the substrate to convey information and to vary locations of contact between the adhesive and a cutting mechanism making variably located lateral cuts across width of the substrate.

* * * * *